No. 887,988. PATENTED MAY 19, 1908.
W. R. C. WAKLEY & R. PARSONS.
DEODORIZER FOR INTERNAL COMBUSTION ENGINES.
APPLICATION FILED DEC. 14, 1907.
2 SHEETS—SHEET 1.
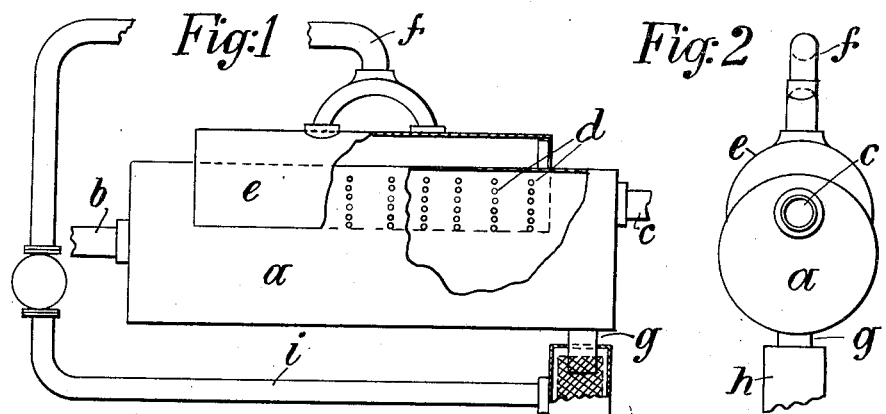
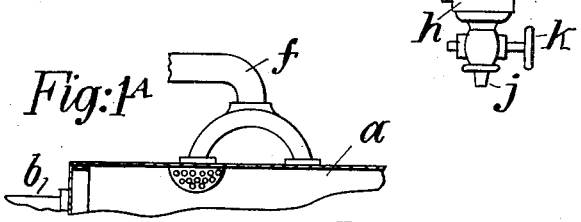
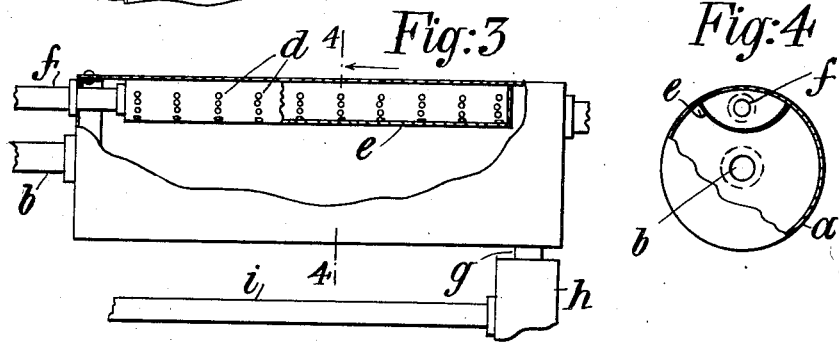
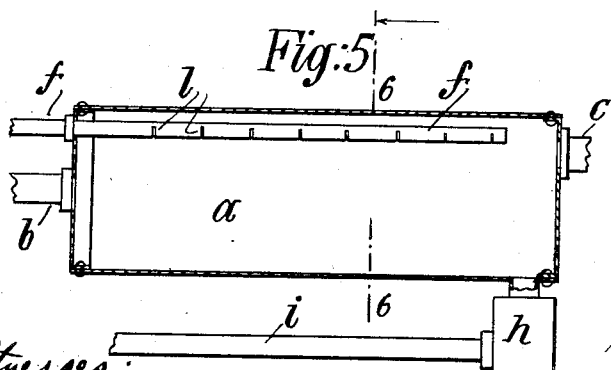
Witnesses:
H H Knight
Octavius Knight
Inventors
William R. C. Wakley
Robert Parsons
By Knight Bros.
attys.

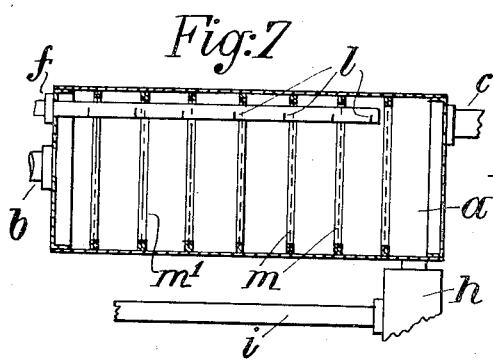
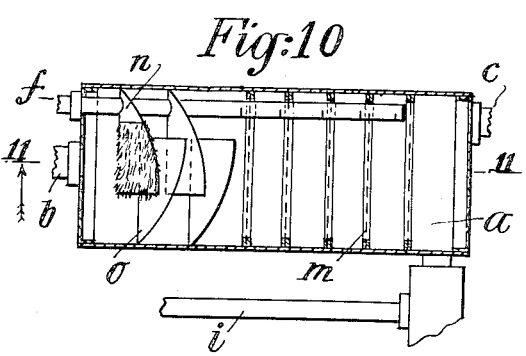
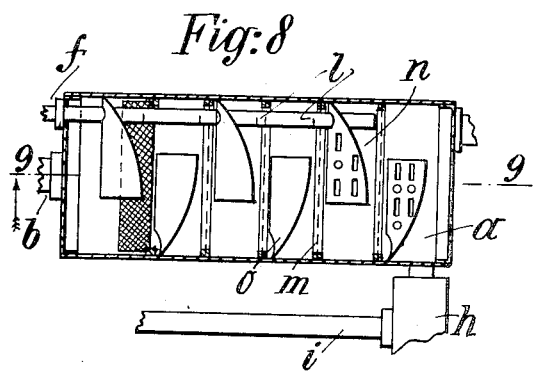
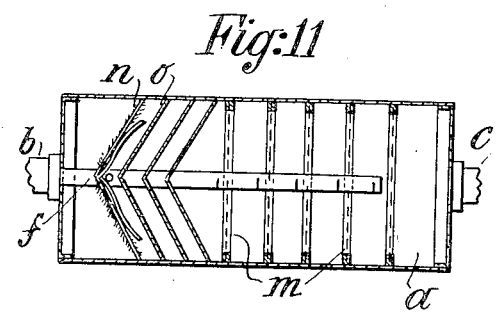
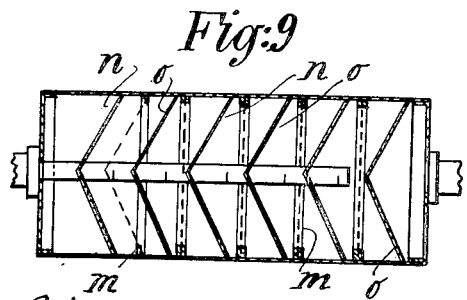

UNITED STATES PATENT OFFICE.

WILLIAM R. C. WAKLEY AND ROBERT PARSONS, OF LONDON, ENGLAND.

DEODORIZER FOR INTERNAL-COMBUSTION ENGINES.

No. 887,988.  Specification of Letters Patent.  Patented May 19, 1908.

Application filed December 14, 1907. Serial No. 406,558.

*To all whom it may concern:*

Be it known that we, WILLIAM ROBERT CLAPCOTT WAKLEY and ROBERT PARSONS, subjects of the King of Great Britain, residing at London, England, have invented a new and useful Deodorizer for Internal-Combustion Engines, of which the following is a specification.

The invention relates to that type of apparatus used with internal combustion engines to deodorize the burning gases emanating from the engine, in which a jet or spray, or a number of jets or sprays, of water, either plain or treated chemically or otherwise, is injected into the said apparatus when said gases are passing through the same, in order to arrest and precipitate the pungent matter carried by said gases. In such apparatus the exhaust gases have passed through a body of accumulated water, thereby producing back pressure, and the gases have passed downwards in the same direction as the jets of water.

The object of the present invention is to produce a deodorizer in which the liquid may be used continuously, in which the back pressure is so slight that it is inappreciable, and which is very effective in use.

According to the present invention the apparatus is provided with an outlet at its bottom so arranged as to prevent any accumulation of liquid, said outlet leading to a sump or receiver which is provided with a strainer or filter and a return pipe, through which latter the liquid is exhausted by means of a pump and returned to the cooler or other tank, from which the liquid again passes to the deodorizer, such pump and cooler forming part of the usual, or part of a special, water circulating system. Further, we do not pass the exhaust gases in the same direction as the jets of liquid, but we pass them preferably at right angles thereto, and we place the inlet and outlet pipes for the gases in such a position that the gases do not pass through an accumulated body of liquid.

When the apparatus is used as a combined deodorizer and silencer the aforesaid screens or baffles, in addition to precipitating the water and pungent matter, act to silence the noise from the exhaust of the engine. And in order that the invention may be more clearly understood and readily carried into effect we will proceed aided by the accompanying drawings more fully to describe the same.

Figure 1 is a side elevation of a deodorizer partly in section and Fig. 2 is an end elevation of the same. Fig. 1ª is a section showing a slight modification. Fig. 3 is a side elevation of a modified form of deodorizer and Fig. 4 is a section on the line 4—4 of Fig. 3. Fig. 5 is a side elevation partly in section of a deodorizer showing another modification and Fig. 6 is a section on the line 6—6 of Fig. 5. Fig. 7 is a central longitudinal section of a combined deodorizer and silencer. Fig. 8 is a central longitudinal section of a modified form of combined silencer and deodorizer and Fig. 9 is a section on the line 9—9 of Fig. 8 looking upwards. Fig. 10 is a central longitudinal section of a combined deodorizer and silencer and Fig. 11 is a section on the line 11—11 of Fig. 10. Fig. 12 is a front elevation of one of the foraminated screens.

As shown in Figs. 1 and 2 $a$ is the chamber, $b$ is the inlet for the exhaust gases and $c$ is the outlet for said gases after they have been purified or deodorized. $d, d$ are perforations in the case $a$ and $e$ is a receptacle for receiving the water from the supply pipe $f$, forming part of a water circulating system. As shown this pipe $f$ has two branches so as to distribute the water more evenly in the receptacle $e$. At one end of said chamber an opening is formed leading by means of the short pipe $g$ to the sump or receiver $h$ which has an aperture leading into the return pipe $i$ forming part of a water circulating system. The sump or receiver $h$ has a strainer or filter $h'$ to collect the oil and any pungent matter, said receiver $h$ having an outlet pipe $j$ which is provided with a cock $k$.

In the construction shown at Figs. 3 and 4 the receptacle $e$ for the water from the supply pipe $f$ is located within the case $a$ and the perforations $d, d$ are formed in this receptacle $e$.

In the construction shown at Figs. 5 and 6 the supply pipe $f$ is carried direct into the casing $a$ and is closed at its end thus forming a water receptacle. It is formed with slits $l$ in its under side through which the water enters the chamber $a$. In all these forms the water or other liquid enters the chamber a in a series of close jets or sheets and the exhaust gases are compelled to pass right through the liquid whereby they are purified.

The combined deodorizers and silencers shown at Figs. 7 to 11 are all shown with the water supply pipe f entering the chamber a and having slits l, l.

In Fig. 7 the case a has a number of vertical flat metal screens m some of which are entirely foraminated and others of which, m', are partly foraminated and partly solid, which not only act to silence the exhaust gases but also prevent the water being blown right through the casing a. These screens m, m', precipitate the water and matter contained therein as hereinbefore described.

In Figs. 8 and 9 the combined deodorizer and silencer is not only provided with the flat foraminated screens m but it is also provided with baffles n, o, which meet at an angle on the center line of the casing. These baffles occupy a little more than half the diameter of the casing a, or in other words they slightly overlap each other, so that the gases are compelled to pass in a zig-zag direction through the case a. The lower baffles o are perforated as shown to allow the water to pass along the bottom of the case to the sump h. If desired both sets of baffles n, o, may be formed with perforations or slits as shown to allow some of the gases to pass through the same.

In the combined deodorizer and silencer shown at Figs. 10 and 11, all the baffles n, o, are arranged at one end of the apparatus and all the flat screens m are arranged at the other end of the apparatus. If desired the screens m may be arranged at the inlet end of the apparatus and the baffles n, o, may be arranged at the outlet end of the apparatus, but this modification is not shown as it will be well understood.

Some of the baffles may be made partly of asbestos or other suitable fibrous material; one of such baffles is shown in Fig. 10.

What we claim as our invention is:—

1. In a deodorizer for the exhaust gases of an internal combustion engine, the combination of a casing, a perforated water receptacle connected to a water circulating system, an inlet and an outlet for the exhaust gases so arranged that the said gases pass through the jets of water, a sump to receive the water, a filter, and a pipe connecting the sump with the said water circulating system.

2. In a deodorizer for the exhaust gases of an internal combustion engine, the combination of a casing, a perforated water receptacle connected to a water circulating system, an inlet and an outlet for the exhaust gases so arranged that the said gases pass through the jets of water, a series of screens arranged in said casing to precipitate the water, a sump to receive the water, a filter, and a pipe connecting the sump with the said water circulating system.

3. In a deodorizer for the exhaust gases of an internal combustion engine, the combination of a casing, a perforated water receptacle connected to a water circulating system, an inlet and an outlet for the exhaust gases so arranged that such gases pass through the jets of water, a series of foraminated screens and a series of baffles so arranged as to precipitate the water, a sump to receive the water, a filter, and a pipe connecting the sump with the said water circulating system.

4. In a deodorizer for the exhaust gases of an internal combustion engine, the combination of a casing, a perforated water receptacle connected to a water circulating system, an inlet and an outlet for the exhaust gases so arranged that such gases pass through the jets of water, a series of foraminated screens and a series of baffles made partly of fibrous material so arranged as to precipitate the water, a sump to receive the water, a filter, and a pipe connecting the sump with the said water circulating system.

5. In a deodorizer for the exhaust gases of an internal combustion engine, the combination of a casing, a perforated tube entering such casing and connected to a water circulating system, an inlet and an outlet for the exhaust gases so arranged that the gases pass through the water, a sump to receive the water, a filter, and a pipe connecting the sump with the said water circulating system.

6. In a deodorizer for the exhaust gases of an internal combustion engine, the combination of a casing, a slotted tube entering such casing and connected to a water circulating system, an inlet and an outlet for the exhaust gases so arranged that the gases pass through the water, a sump to receive the water, a filter and a pipe connecting the sump with the said water circulating system.

7. In a deodorizer for the exhaust gases of an internal combustion engine, the combination of a casing, a perforated water receptacle connected to a water circulating system, an inlet and an outlet for the exhaust gases so arranged that such gases pass through the jets of water, a series of foraminated screens and a series of baffles arranged at an angle to the line of travel of the gases, so arranged as to precipitate the water, a sump to receive the water, a filter, and a pipe connecting the sump with the said water circulating system.

8. In a deodorizer for the exhaust gases of an internal combustion engine, the combination of a casing, a perforated water receptacle connected to a water circulating system, an inlet and an outlet for the exhaust gases so arranged that such gases pass through the jets of water, a series of foraminated screens and a series of baffles arranged at an angle to the line of travel of the gases, made partly of fibrous material, so arranged as to precipitate the water, a sump to receive the water, a filter, and a pipe connecting the sump with the said water circulating system.

In witness whereof we have hereunto set our hands in presence of two witnesses.
W. R. C. WAKLEY.
ROBT. PARSONS.

Witnesses:
WM. GIRLING,
H. W. JAMESON.